United States Patent [19]
Uno

[11] Patent Number: 5,296,696
[45] Date of Patent: Mar. 22, 1994

[54] SOLID STATE IMAGE PICKUP APPARATUS AND DRIVING METHOD

[75] Inventor: Masayuki Uno, Ina, Japan

[73] Assignee: Olympus Optical Co., Ltd., Tokyo, Japan

[21] Appl. No.: 1,656

[22] Filed: Jan. 7, 1993

[30] Foreign Application Priority Data

Jan. 29, 1992 [JP] Japan .................................. 4-036923

[51] Int. Cl.⁵ .............................................. H01J 40/14
[52] U.S. Cl. .................................... 250/208.1; 348/246
[58] Field of Search ................. 250/208.1; 358/213.15, 358/213.18

[56] References Cited

U.S. PATENT DOCUMENTS

| | | | |
|---|---|---|---|
| 5,043,820 | 8/1991 | Wyles et al. | 250/208.1 |
| 5,144,133 | 9/1992 | Dudley et al. | 250/208.1 |
| 5,155,348 | 10/1992 | Ballingal et al. | 250/208.1 |
| 5,182,446 | 1/1993 | Tew | 250/208.1 |
| 5,204,519 | 4/1993 | Nishihara et al. | 250/208.1 |

*Primary Examiner*—Michael Messinger
*Attorney, Agent, or Firm*—Armstrong, Westerman, Hattori, McLeland & Naughton

[57] ABSTRACT

A solid state image pickup apparatus comprises pixels each of which is composed of a photoelectric transducer element having a function of amplification, and further comprises FPN suppression circuits basic cells provided for the pixel, wherein the FPN suppression circuit comprises an inverting amplifier; an input capacitor connected between the output of the pixel and the input of the inverting amplifier; a n-MOS transistor for supplying an initial voltage to the input of the inverting amplifier; a feedback capacitor one terminal of which is connected to the input of the inverting amplifier; a n-MOS transistor connected between the other terminal of the feedback capacitor and the output of the inverting amplifier; and a n-MOS transistor connected between the node connecting the above two elements and a reference voltage source. As an advantage of this configuration, it is possible to achieve a solid state image pickup apparatus in which the FPN, caused by offset difference among the pixels composed of photoelectric transducer elements having a function of amplification, is suppressed without increasing chip area, and in which it is possible to perform a non-destructive readout.

21 Claims, 8 Drawing Sheets

SOLID STATE IMAGE PICKUP APPARATUS AND DRIVING METHOD

BACKGROUND OF THE INVENTION

The present invention relates to a solid state image pickup apparatus whose unit pixel is composed of a photoelectric transducer element, and more particularly, to a solid state image pickup apparatus whose fixed pattern noise (hereafter referred to as FPN) due to the difference in characteristics of amplification elements between each pixel is suppressed, and also to its driving method.

In addition to MOS and CCD type devices, there is known another type solid state image pickup device whose pixel includes an amplification element, such as SIT, AMI, CMD, BASIS, and FGA. This type solid state image pickup device has characteristic features which cannot obtained by solid state image pickup devices, such as MOS and CCD. For example, amplification elements in pixels make it insensitive to noise entering signal lines. Therefore, a high S/N ratio is achievable. Besides, non-destructive read-out is available in this device. While it has the above advantages, it has a drawback that it exhibits large FPN due to the variation in amplification element characteristics between pixels, and this large FPN results in a low S/N ratio.

Figure 1:
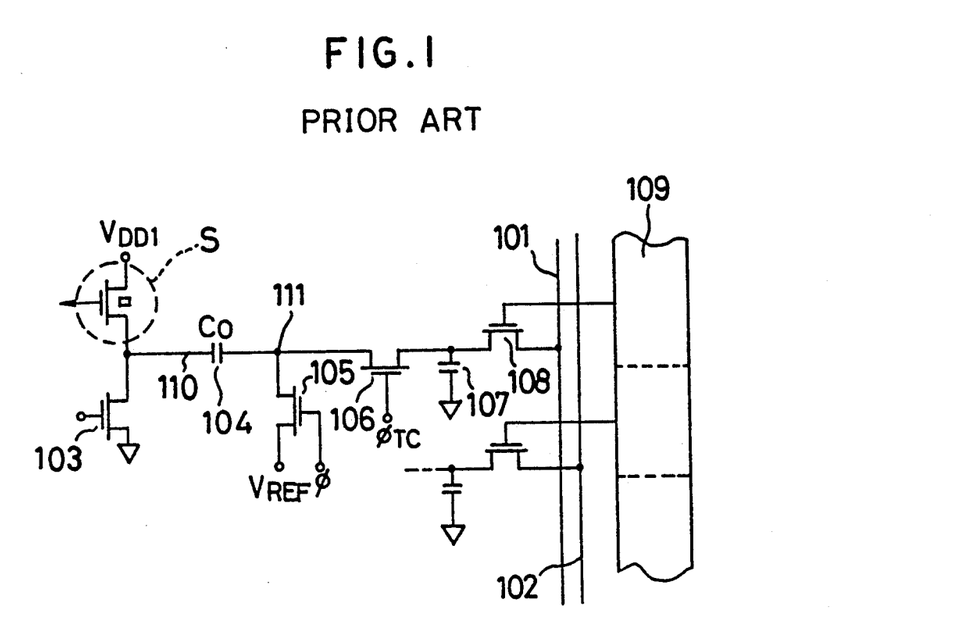
FIG. 1 is a circuit diagram showing a configuration of a conventional solid state image pickup apparatus having a FPN suppression circuit.

In view of such high FPN, there are proposed various circuits provided on a chip for suppressing FPN. FIG. 1 shows an example of a configuration of a FPN suppression circuit used in FGA disclosed in Japanese Patent Application Laid-Open No.64-2354 or in "A New Device Architecture Suitable for High-Resolution and High-Performance Image Sensors", IEEE Trans. on ED, Vol. 35, No. 5, May, 1988. In FIG. 1, S is a unit pixel which is one of pixels arranged in 2-dimensional form. There is provided a source line (vertical signal line) to connect amplification elements in common for every column of a pixel array arranged in 2-dimensional form. A FPN suppression circuit is connected for every column. Outputs of the FPN suppression circuits are connected alternately every two column to one of two signal output lines 101 and 102. 103 is a bias transistor, 104 is a capacitor, 105 is a clamping transistor, 106 is a sample-and-hold transistor, 107 is a capacitor, 108 is a switching transistor, and 109 is a horizontal scanning circuit. In this configuration, suppression of FPN is achieved in the following way: That is, during a horizontal blanking interval, the capacitor 107 stores the voltage corresponding to the difference between the signal output obtained after performing of photo integration for a selected row of the pixel array and the output obtained just after the resetting, then, during a horizontal scanning period, the charge stored in the capacitor 107 is read out.

Figure 2:
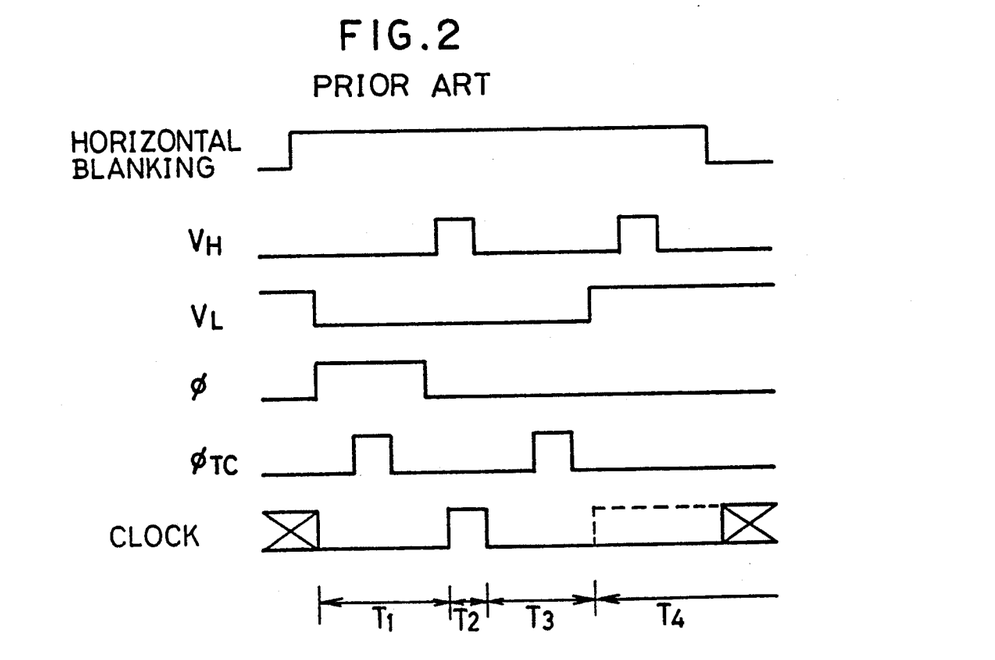
FIG. 2 is a timing chart for explanation of operation of the conventional configuration shown in FIG. 1.

Now, referring to the timing chart in FIG. 2, operation of this suppression circuit will be described. During a period $T_1$, both of the clamping transistor 105 and sample-and-hold transistor 106 are ON, thus the capacitor 107 is reset and the voltage of node 111 is clamped to a reference voltage Vref. At this time, the signal output including a offset voltage $V_0$ appears at the other node (node 110) of the capacitor 104. As a result, the capacitor 104 stores the charge described as $(V_{PS} + V_0 - V_{ref}) \cdot C_0$, where $V_{PS}$ is a voltage increment given by integration. Then, during a period $T_2$, the clamping transistor 105 is turned off and all pixels of the selected row are reset. At the same time, the sample-and-hold transistor 106 is also turned off. After that, during a period $T_3$, because each pixel has been just reset, only the off set voltage $V_0$ including no signal component appears at the node 110. In this state, when the sample-and-hold transistor 106 turns on, the capacitor 107 stores a voltage V' including no offset, given by $$V' = C_0/(C_L + C_0) \cdot (V_{ref} - V_{PS}) \quad (1)$$

where $C_0$ and $C_L$ are capacitances of the capacitors 104 and 107, respectively. This signal is read out during a period $T_4$. Taking into account a parasitic capacitance $C_P$ of the signal output line 101 (102), the output voltage $V_{OUT}$ is given by $$\begin{aligned} V_{OUT} &= C_L/(C_P + C_L) \cdot V' \\ &= C_L/(C_P + C_L) \cdot C_0/(C_L + C_0) \cdot (V_{ref} - V_{PS}) \end{aligned} \quad (2)$$

In this way, the signal output with suppressed FPN due to the variation in offset voltage is achieved.

Figure 3:
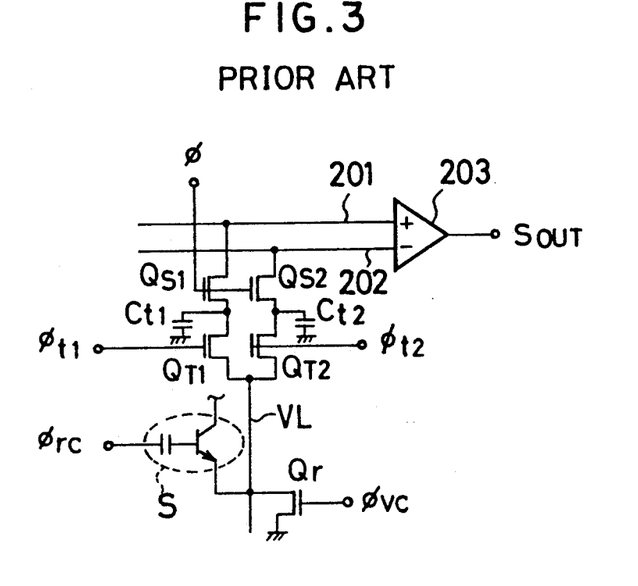
FIG. 3 is a circuit diagram showing another configuration of a conventional solid state image pickup apparatus having a FPN suppression circuit.

FIG. 3 shows another example of a configuration of a FPN suppression circuit applied for a BASIS, disclosed in Japanese Patent Application Laid-Open No.63-86471. As in the case of FGA, this FPN suppression circuit is also shown just for one pixel S. In FIG. 3, a suppression circuit is provided for every vertical signal line of each column, and the outputs of all suppression circuits are connected in common to a signal output line 201 or 202.

Figure 4:
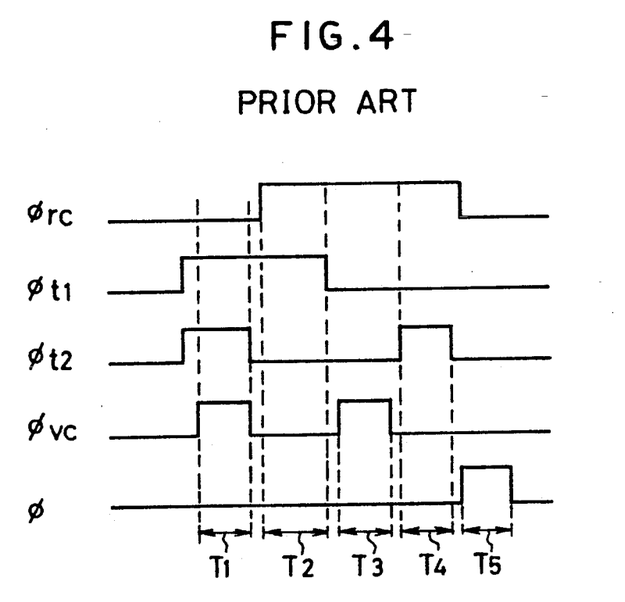
FIG. 4 is a timing chart for explanation of operation of the conventional configuration shown in FIG. 3.

Referring to the timing chart shown in FIG. 4, operation of the above FPN suppression circuit will be described. During a period $T_1$, resetting of capacitors $C_{t1}$ and $C_{t2}$ is carried out. During a period $T_2$, the pixel S is read out and the capacitor $C_{t1}$ stores a signal voltage including a offset voltage $V_0$. Representing a voltage increment in accordance with photo integration by $V_{PS}$, the capacitor $C_{t1}$ stores a voltage $V_{t1}$ given by $$V_{t1} = V_{PS} + V_0 \quad (3)$$

During a period $T_3$, resetting of the pixel S is carried out and the photo integration charge stored in the pixel is swept out. During a period $T_4$, a voltage obtained just after resetting the pixel S is stored in the capacitor $C_{t2}$. Here, the voltage $V_{t2}$ given to the capacitor $C_{t2}$ is described by $$V_{t2} = V_0 \quad (4)$$

During a period $T_5$, transistors $Q_{S1}$ and $Q_{S2}$ are turned on so that the charges stored in capacitors $C_{t1}$ and $C_{t2}$ are connected to the signal output lines 201 and 202, respectively, so as to read out the difference between the voltages of these signal output lines via a differential amplifier 203. Assuming that capacitances of the capacitor $C_{t1}$ and $C_{t2}$ are $C_{t1} = C_{t2} = C_t$, the parasitic capacitance of the signal output lines 201 and 202 is $C_P$, and the gain of the differential amplifier 203 is 1, the output voltage $V_{OUT}$ obtained from an output terminal $S_{OUT}$ is given by $$\begin{aligned} V_{OUT} &= C_t/(C_P + C_t) \cdot V_{t1} - C_t/(C_P + C_t) \cdot V_{t2} \\ &= C_t/(C_P + C_t) \cdot V_{PS} \end{aligned} \quad (5)$$

As described above, the readout signal including a photo charge and the signal obtained just after the photo charge is reset are stored in different capacitors respectively, then by taking the difference between these signals as an output, the suppression of FPN is achieved.

However, the above methods for reducing FPN of solid state image pickup devices have the following problems: First, in both methods, as can be seen from equations (2) and (5), the parasitic capacitance $C_P$ existing on the signal lines causes the reduction in output voltages. To avoid this reduction, capacitances of the capacitors $C_t$, $C_L$, and $C_O$ must be sufficiently large compared to the parasitic capacitance $C_P$. However, the increase in these capacitances requires the increase of the chip area. Secondly, when charges stored in capacitors are read out, the charges are distributed to the parasitic capacitances of the signal lines. As a result, the storage charges are destroyed and it is impossible to perform the non-destructive readout.

SUMMARY OF THE INVENTION

It is an object of the present invention to solve the above problems with conventional solid state image pickup devices having amplification function in their pixels. More specifically, it is an object of the present invention to provide a solid state image pickup device having a FPN suppression circuit which enables large output gain and non-destructive readout even with large parasitic capacitances of signal lines, without increasing the chip area, and also to provide its driving method.

To solve the above problems, the present invention provides a solid state image pickup apparatus comprising pixels composed of a photoelectric transducer element having amplification function, wherein each pixel has a basic cell for reducing fixed pattern noise comprising a inverting amplifier, an input capacitor connected in series between the output of the pixel and the input of the inverting amplifier, a reset switching element for supplying an initial voltage to the input of the inverting amplifier, a feedback capacitor one terminal of which is connected to the input of the inverting amplifier, a feedback switching element connected between the other terminal of the feedback capacitor and the output of the inverting amplifier, and a switching element for supplying a reference voltage connected between a reference voltage source and the node between the feedback capacitor and the feedback switching element.

In the solid state image pickup apparatus having the above configuration, operation is performed as follows: In a state where both of the reset switching element and the switching element for supplying the reference voltage are ON while the feedback switching element is OFF, reset or readout of a pixel is carried out. Then the reset switching element and the switching element for supplying the reference voltage are turned off, and the feedback switching element is turned on to perform readout or reset of a pixel. Thus, the difference between the readout signal output and the reset output can be read out as an output voltage of a basic cell. As a result, the reduction of FPN caused by the variation in offset voltage of pixels composed of a photoelectric transducer element having a function of amplification is achieved. In addition, the output voltage of a basic cell can be read out many times non-destructively.

DESCRIPTION OF THE PREFERRED EMBODIMENTS

Figure 5:
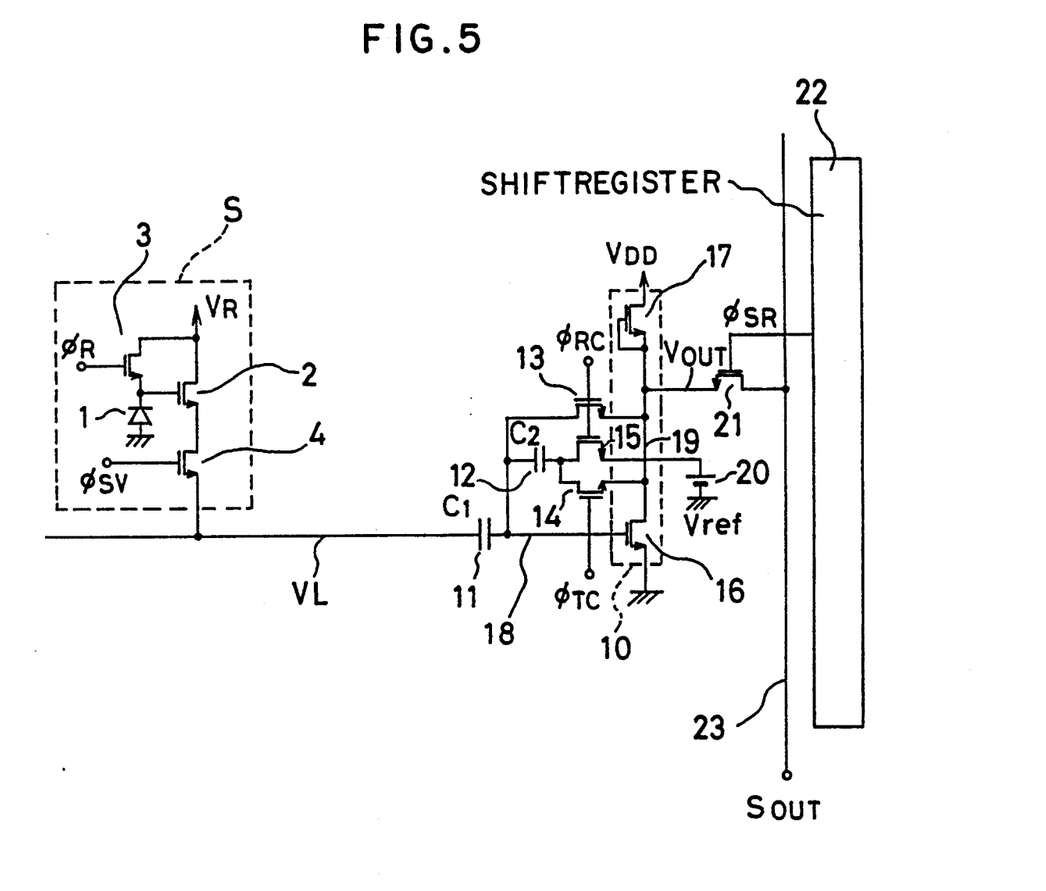
FIG. 5 is a circuit diagram of one pixel included in a solid state image pickup apparatus embodying the present invention.

Now, various embodiments will be described. FIG. 5 shows a circuit configuration of a part of a first embodiment of a solid state image pickup apparatus according to the present invention. In this embodiment, the present invention is applied for a solid state image pickup apparatus comprising a pixel array in which AMIs are arranged in 2-dimensional form. In FIG. 5, S represents an AMI unit pixel. One AMI pixel comprises a photodiode 1, an amplification n-MOS transistor 2, a reset n-MOS transistor 3, and a readout n-MOS transistor 4 which is connected to a vertical signal line VL. First, in the operation of the AMI having such a configuration, the level of a reset pulse $\phi_R$ made to be 'H' to apply a reset voltage $V_R$ to the photodiode 1. Then the level of the reset pulse is altered to 'L'. After this time, the junction capacitance of the photodiode 1 stores the charge generated by photoelectric transduction and the gate voltage of amplification n-MOS transistor 2 falls gradually. After a predetermined integration period, the level of a pulse $\phi_{SV}$ is made to be 'H' to apply the signal output corresponding to the gate voltage to the vertical signal line VL. In the conventional configuration, the signal of each column applied to the vertical signal line VL is read out as an output signal by successively turning on horizontal selection switches with a horizontal scanning circuit.

In the present embodiment, to reduce FPN, a FPN suppression circuit is inserted between the vertical signal line VL and a horizontal selection transistor 21 for every column of the pixel array, as shown in FIG. 5. In FIG. 5, 10 represents an inverting amplifier comprising a n-MOS transistor 16 whose source is grounded, and a depletion mode n-MOS transistor 17 acting as a load. The input node 18 of this inverting amplifier is connected to the vertical signal line VL via a capacitor 11 in series. A feedback system comprising a capacitor 12 and a switching n-MOS transistor 14 is provided between the input node 18 and the output node 19. In parallel with the feedback system, there is also provided a reset n-MOS transistor 13 for applying an initial voltage to the node 18. Resetting may be performed by turning on n-MOS transistors 13 and 14 at the resetting time. However, in this case, the variation in characteristics of amplification n-MOS transistor 16 generates FPN. To avoid the generation of FPN, there is provided a switching n-MOS transistor 15 one node of which is connected to a reference voltage (Vref) source 20 so that a predetermined initial voltage is applied to the output of a capacitor 12. The output node 19 of the FPN suppression circuit is connected to the horizontal selection transistor 21 so that the voltage of the output node 19 is transferred to a signal line 23 when the transistor 21 is turned on by a shiftregister 22.

Figure 6:
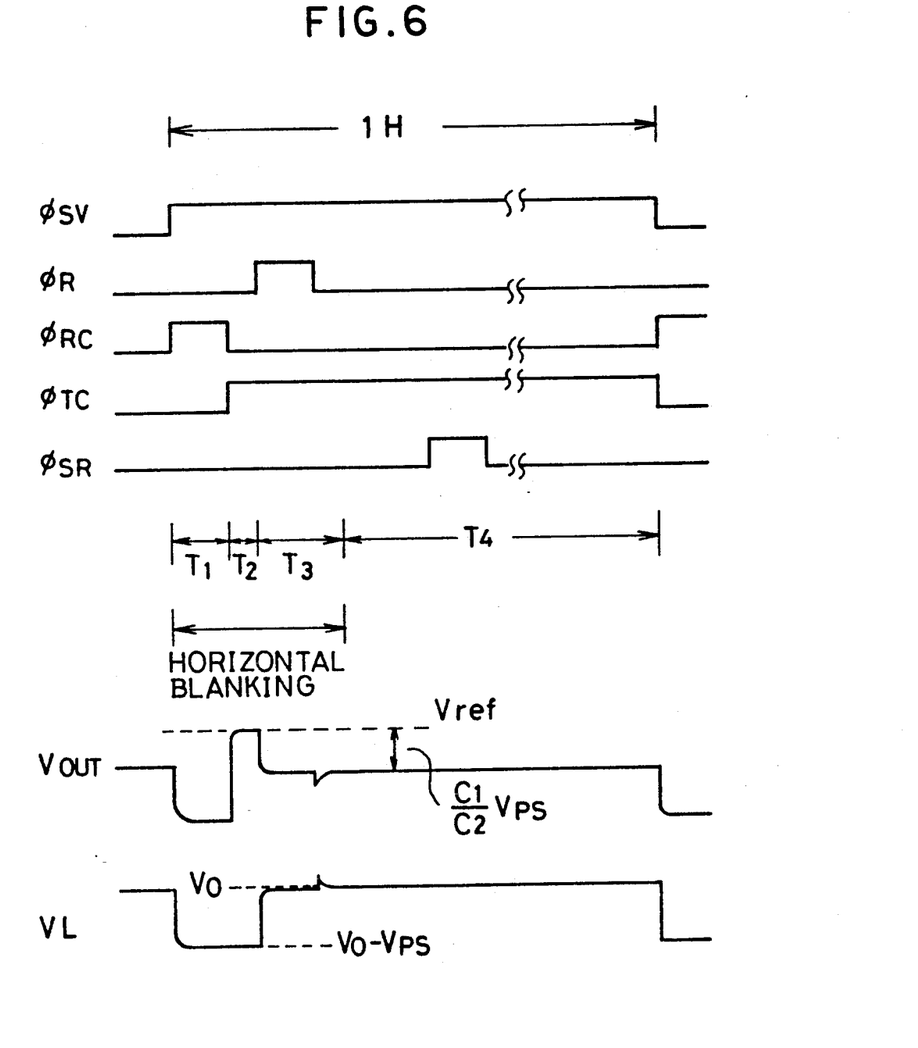
FIG. 6 is a timing chart for explanation of operation of the embodiment shown in FIG. 5.

Now, referring to the timing chart shown in FIG. 6, the operation will be described. The pulse $\phi_{SV}$ selects simultaneously all pixels arranged on the same row of the pixel array during a horizontal scanning interval (1 H) of one frame so as to connect these pixels to the vertical signal line VL. During a horizontal blanking interval ($T_1$ through $T_3$) in this interval 1 H, FPN suppression operation is performed. Then, during a period $T_4$, the signal with suppressed FPN is read out for pixels of one row.

During a period $T_1$, an initial voltage is applied to the FPN suppression circuit. At this time, the voltage of the vertical signal line VL is lower than an off set voltage $V_0$ of the pixel S by a signal voltage $V_{PS}$. Furthermore, n-MOS transistors 13 and 15 are ON, thus the gate-to-source voltage $V_{GS}$ of the n-MOS transistor 16 in the inverting amplifier 10 is applied to the nodes 18 and 19, and the reference voltage Vref is applied to the output node of the capacitor 12. Hence, the charges $Q_1$ and $Q_2$ stored at this time in the capacitors 11 and 12 (capacitances, $C_1$ and $C_2$) are given by $$Q_1 = C_1 \cdot \{V_{GS} - (V_0 - V_{PS})\} \quad (6)$$

$$Q_2 = C_2 \cdot (V_{GS} - Vref) \quad (7)$$

During a period $T_2$, n-MOS transistor 15 turns off while n-MOS transistor 14 turns on. Let us assume that the voltage of the node 19 rises in this period by $\Delta V$ from the initial voltage $V_{GS}$. Representing the gain of the inverting amplifier 10 by $-G$, the voltage of the node 18 falls by $\Delta V/G$. Therefore, the charges $Q_1'$ and $Q_2'$ stored in the capacitor 11 and 12 are given by $$Q_1' = C_1 \cdot \{(V_{GS} - 1/G \cdot \Delta V) - (V_0 - V_{PS})\} \quad (8)$$

$$Q_2' = C_2 \cdot \{(V_{GS} - 1/G \cdot \Delta V) - (V_{GS} - \Delta V)\} \quad (9)$$

During the period $T_1$ and $T_2$, the charge at the node 18 is conserved. Therefore, the following equation (10) is obtained:

$$Q_1 + Q_2 = Q_1' + Q_2' \quad (10)$$

From equation (10) $\Delta V$ can be obtained (using the approximation: $1/(1+\Delta) \approx 1 - \Delta$) as follows:

$$\Delta V = (Vref - V_{GS})/\{1 + 1/G(1 + C_1/C_2)\} \quad (11)$$
$$\approx (Vref - V_{GS}) \cdot \{1 - 1/G(1 + C_1/C_2)\}$$

Hence, the output voltage $V_{OUT}$ is given by $$V_{OUT} = V_{GS} + \Delta V \quad (12)$$
$$= Vref - 1/G \cdot (1 + C_1/C_2) \cdot (Vref - V_{GS})$$

As can be seen from equation (12) the following equation (13) is obtained for large G:

$$V_{OUT} \approx Vref \quad (13)$$

During a period $T_3$, the reset n-MOS transistor 3 of the pixel S is turned on to perform reset operation of the pixel. Just after the reset operation, the voltage of the vertical signal line VL becomes equal to the off set voltage $V_0$ of the pixel. As a result of this, the output $V_{OUT}$ to $V_{GS} + \Delta V'$. Here, the charges $Q_1''$ and $Q_2''$ stored in the capacitors 11 and 12 are given by $$Q_1'' = C_1 \cdot \{(V_{GS} - 1/G \cdot \Delta V') - V_0\} \quad (14)$$

$$Q_2'' = C_2 \cdot \{(V_{GS} - 1/G \cdot \Delta V') - (V_{GS} + \Delta V')\} \quad (15)$$

From the conservation of charges, the following equation (16) can be obtained:

$$Q_1 + Q_2 = Q_1'' + Q_2'' \quad (16)$$

From equation (16), $\Delta V'$ is obtained as $$\Delta V' = (Vref - V_{GS} - C_1/C_2 \cdot V_{PS})/\{1 + 1/G(1 + C_1/C_2)\} \quad (17)$$
$$\approx (Vref - V_{GS} - C_1/C_2 \cdot V_{PS}) \cdot \{1 - 1/G(1 + C_1/C_2)\}$$

Hence, the output voltage $V_{OUT}$ is given by $$V_{OUT} = V_{GS} + \Delta V' \quad (18)$$
$$= Vref - C_1/C_2 \cdot V_{PS} - 1/G \cdot (1 + C_1/C_2) \cdot$$
$$(Vref - V_{GS} - C_1/C_2 \cdot V_{PS})$$

From equation (18), the following equation (19) is obtained for large gain G:

$$V_{OUT} \approx Vref - C_1/C_2 \cdot V_{PS} \quad (19)$$

In equation (18), the variation in $V_{GS}$ is associated with FPN. However, it can be seen that the variation is reduced by the factor $1/G \cdot (1 + C_1/C_2)$. Consequently, as far as the gain is sufficiently large, there is almost no influence on the output. Thus, as shown in equation (19), the change in signal voltage can be output with no influence of the variation of offset voltage of each pixel.

Furthermore, there is an advantage that the FPN suppression circuit also acts as a voltage amplification by setting the capacitance $C_1$ of the capacitor 11 to a value large enough compared to the capacitance $C_2$ of the capacitor 12. Besides, the values of $C_1$ and $C_2$ can be determined independently of the parasitic capacitance of the signal output line 23, thus the increase of the chip area caused by these capacitors can be limited to the least extent. Furthermore, the signal voltage with suppressed FPN shown in equation (19) is preserved even after many repetitions of readout by turning on the horizontal selection n-MOS transistor 21. In other words, non-destructive readout can be achieved.

As described above, by using a basic cell in which a FPN suppression circuit is added to an AMI pixel, it is possible to achieve a solid state image pickup apparatus whose FPN is suppressed and which can be read out non-destructively, without a large amount of increase in a chip area.

Now, there will be described an embodiment in which the above FPN suppression circuit is applied for a line sensor including pixels arranged in 1-dimensional form. In the case of an application for a line sensor, a FPN suppression circuit can be provided for every pixel. Therefore, it is possible to perform resetting operation at the same time for both of a FPN suppression circuit and a pixel. Thus, while continuing integration of a pixel, the signal output can be read out at the same time non-destructively.

Figure 7:
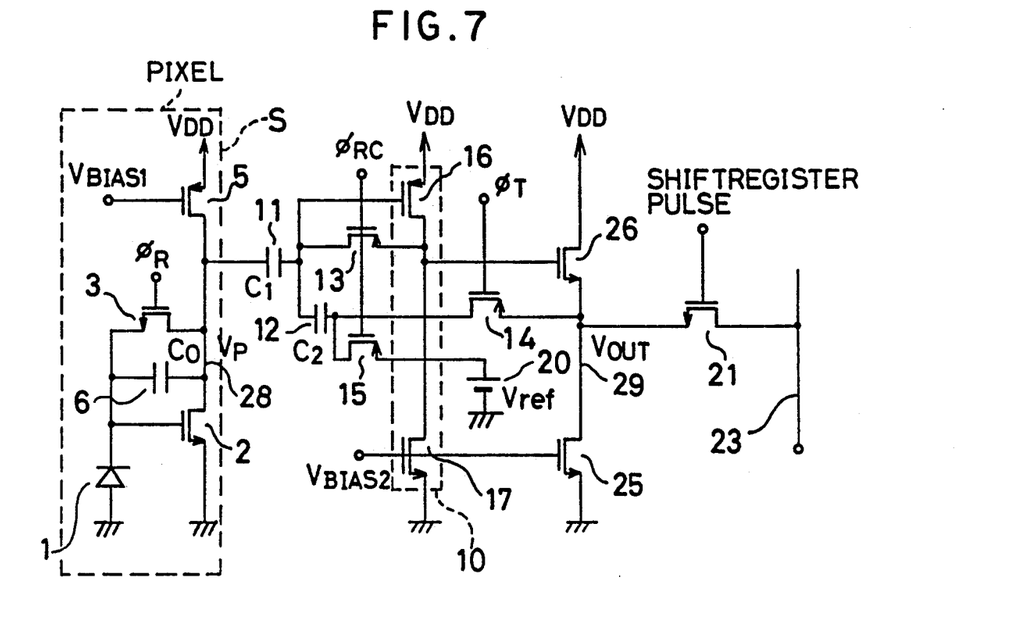
FIG. 7 is a diagram showing a circuit configuration of an embodiment wherein the FPN suppression circuit used in the embodiment shown in FIG. 5 is applied for a line sensor.

FIG. 7 shows a circuit configuration of a line sensor comprising pixels composed of a common-source mode AMI embodying the present invention. In FIG. 7, members equivalent or corresponding to the members of the embodiment shown in FIG. 5 are denoted by the same marks. In FIG. 7, S represents an AMI pixel comprising a photodiode 1, a n-MOS transistor 2 forming a common-source amplifier, an active load p-MOS transistor 5, a reset n-MOS transistor 3, and a feedback capacitor 6. In the case of the pixel shown in FIG. 5, the photo charge is stored in the junction capacitance of the photodiode itself. In contrast, in this common-source mode pixel, the photo charge is stored in the feedback capacitor 6 so that the stored amount of light is detected as the change in drain voltage of the n-MOS transistor 2.

In the present embodiment, the suppression circuit is based on a configuration comprising a common-source inverting amplifier 10 composed of a p-MOS transistor with a source follower buffer using a n-MOS transistor. Alternately, a common-source inverting amplifier composed of a n-MOS transistor as shown in FIG. 5 may be also used to form a configuration for the present embodiment. The difference between the configurations of FIG. 7 and 5 is that some n-MOS transistors are replaced by p-MOS transistors, the load is composed of a n-MOS transistor acting an active load, and there is provided at an output stage a source follower buffer using n-MOS transistors 25 and 26, while the operation principle is exactly the same as that of FIG. 5.

Referring to the timing chart shown in FIG. 8, the operation of the embodiment shown in FIG. 7 will be described. First, during a period $T_1$, resetting of the pixel S and the suppression circuit is carried out. After that, a reset n-MOS transistor 3 turns off and integration starts for a pixel in a period $T_2$. After the integration starts, when the voltage $V_P$ of a node 28 becomes stable, p-MOS transistors 13 and 15 are turned off and a p-MOS transistor 14 is turned on so that a capacitor 12 in the suppression circuit is connected to a feedback system composed of a p-MOS transistor 14. During a period $T_3$, the operation of integration still continues and the resultant rise of voltage $V_P$ of the node 28 leads to an inverted output $V_{OUT}$ appearing at a node 29. After a predetermined integration time elapsed, a pulse from a shiftregister makes a n-MOS transistor 21 turn on so that the inverted output $V_{OUT}$ is transferred to a signal output line 23.

In the above operation, the reference voltage is such a voltage of the pixel output ($V_P$) at the transition time from the period $T_2$ to the period $T_3$. However, the reference voltage is not limited to the voltage just after the resetting. A voltage obtained after the integration is performed for a predetermined period may be also used as a reference voltage. Furthermore, the period $T_2$ may be zero by making the time when a reset pulse $\phi_R$ for driving the reset n-MOS transistor 3 falls coincident with the time when a $\phi_{RC}$ for driving the n-MOS transistor 13 rises. Taking the voltage of $V_P$ at the transition from the period $T_2$ to the period $T_3$ as the reference, the signal component $V_{PS}$ obtained by the photo integration as a rise from the reference is transferred to the node 29 in the form of the voltage $V_{OUT}$ described by $(V_{ref} - C_1/C_2 \cdot V_{PS})$ including the reduction in voltage from the reference voltage Vref. This voltage is transferred to the signal output line 23 by the scanning with the shiftregister, then the readout is carried out. In the above operation, the photo integration is also performed during the readout period. Therefore, in the case where readout is performed again after readout is carried out once, the signal obtained by the integration during the period from the first readout time until the second readout time is superimposed on the signal obtained at the first readout.

Figure 9:
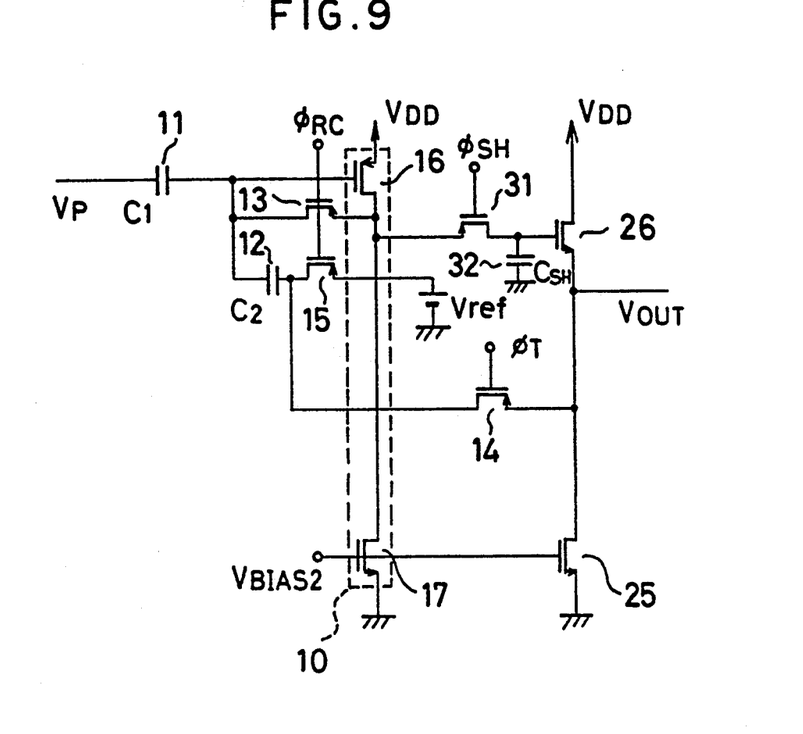
FIG. 9 is a diagram showing a circuit configuration of an embodiment having a FPN suppression circuit with a function of sample and hold.

Now, there will be described another embodiment in which it is possible to perform a lot of repetitions of non-destructive readout of the signal voltage determined at a predetermined time. This is achieved by adding a sample-and-hold circuit to the source follower buffer of FIG. 7. FIG. 9 shows a circuit configuration of an embodiment having a FPN suppression circuit with a function of sample-and-hold circuit. This embodiment is obtained by adding a switching p-MOS transistor 31 and a holding capacitor 32 to the FPN suppression circuit shown in FIG. 7.

Figure 10:
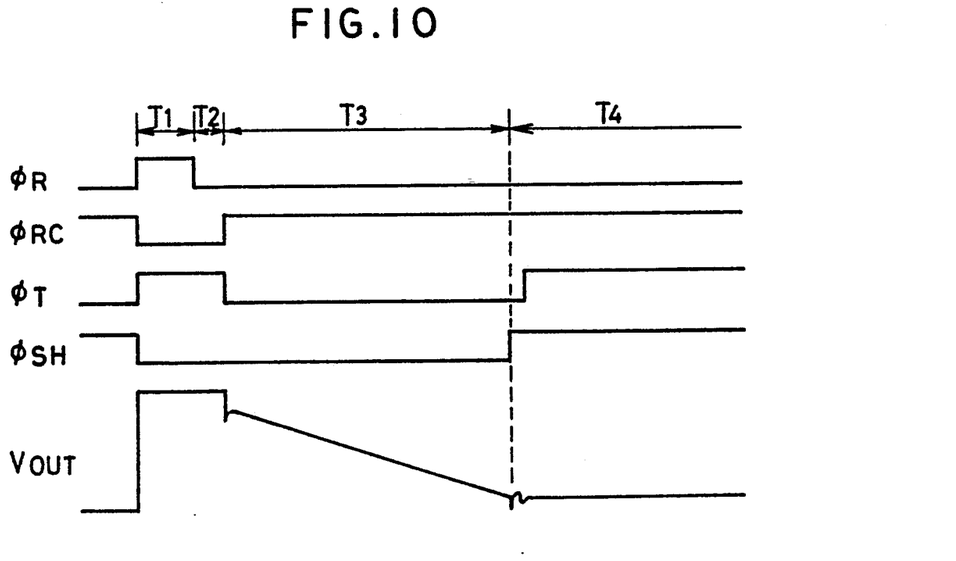
FIG. 10 is a timing chart for explanation of operation of the embodiment shown in FIG. 9.

Referring to the timing chart shown in FIG. 10, the operation of the present embodiment will be described. During periods $T_1$ through $T_3$, exactly the same operations are carried out as those in the embodiment shown in FIG. 7, while the level of a sampling pulse $\phi_{SH}$ is kept to 'L' so that the switching p-MOS transistor 31 is in an ON state. After a predetermined integration period elapsed, $\phi_{SH}$ is made to be 'H' so that the signal voltage at this time is held. As a result of this operation, the voltage of output voltage $V_{OUT}$ does not change during a period $T_4$. Therefore, this signal voltage defined at this time can be read out many times non-destructively. In FIG. 10, after the level of $\phi_{SH}$ became 'H', the level of a pulse $\phi_T$ for driving the p-MOS transistor 14 is made to be 'H' so as to reduce the load associated with the feedback capacitor 12.

Therefore, the readout may be performed using $\phi_T$ remaining 'L', without serious problems. Furthermore, the signal resulting from the continuous integration can be also read out by making the levels of $\phi_{SH}$ and $\phi_T$ 'L' after the completion of readout.

Now, there will be described an embodiment in which the above FPN suppression circuit is used to obtain the addition output of pixels. As described earlier, the above FPN suppression circuit has characteristic features that the capacitances $C_1$ and $C_2$ of capacitors can be determined independently of the signal line capacitance, and it is possible to perform non-destructive readout. In addition to these two features, there is another feature that the reference level can be set arbitrarily. In usual sensors, the output signal component contains a certain offset component. Therefore, if all the components are simply added, saturation occurs in the signal component due to the offset components. To avoid this problem, it is required to perform addition for the difference between the signal components and the reference levels wherein the reference levels are given as outputs of OB pixels (optically blind pixels). In contrast, in the above FPN suppression circuit, the reference level can be arbitrarily set independently of the offset of the pixel. Therefore, using the GND level as the reference level, the addition of pixels can be performed efficiently.

Figure 11:
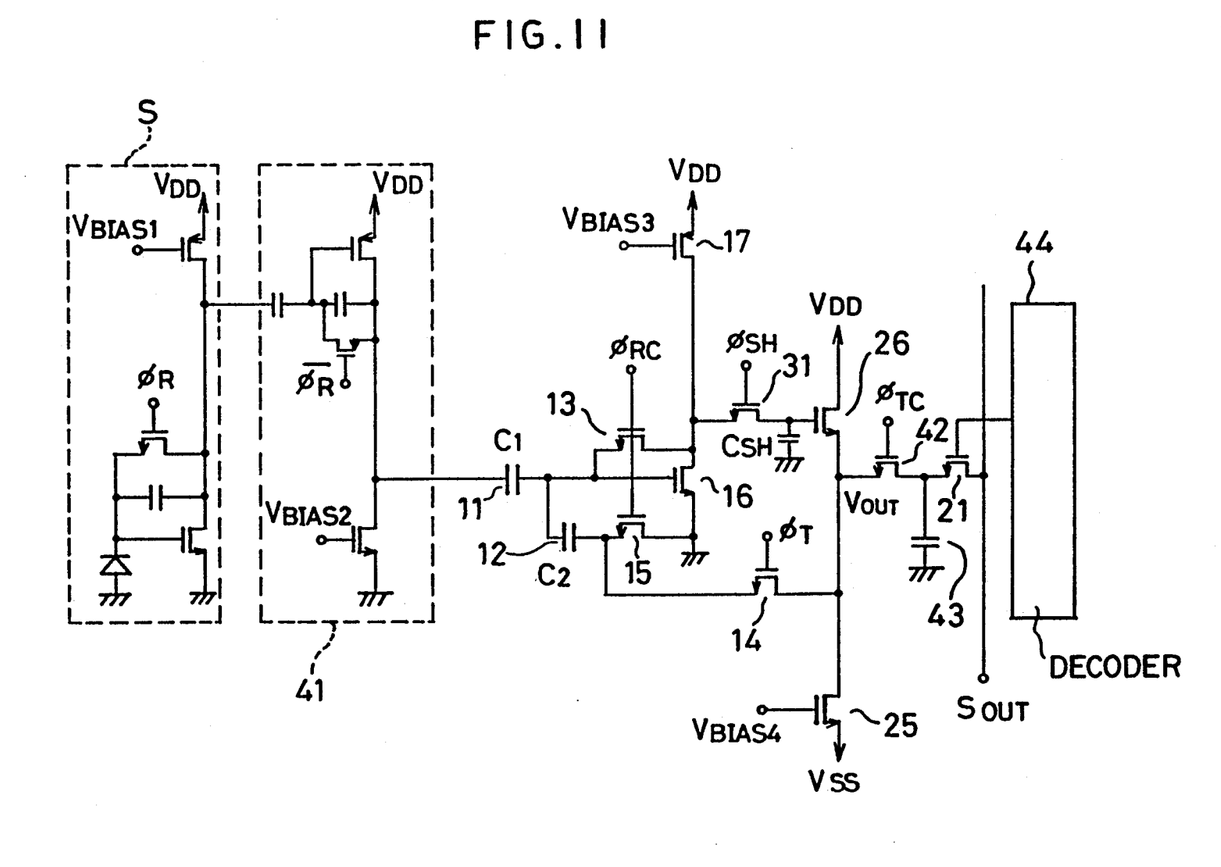
FIG. 11 is a diagram showing a circuit configuration of an embodiment wherein an addition output of pixels is available.

FIG. 11 shows an embodiment which is obtained by modifying the embodiment shown in FIG. 7 so that the addition output is available. In FIG. 11, members equivalent or corresponding to the members of the embodiment shown in FIG. 7 are denoted by the same marks. Here, the modification is made in such a way that an inverting amplifier 41 is added to the embodiment of FIG. 7 so as to obtain the output in the positive direction with respect GND reference. To adapt the above modification, the FPN suppression circuit is modified in such a way it is configured with a common-source amplifier composed of a n-MOS transistor. In addition to the above, the most significant feature in the modification is that a switching n-MOS transistor 42 for performing sampling of the output voltage $V_{OUT}$ and a holding capacitor 43 are added and that there is provided a decoder 44 for switching a selection n-MOS transistor 21.

Figure 12:
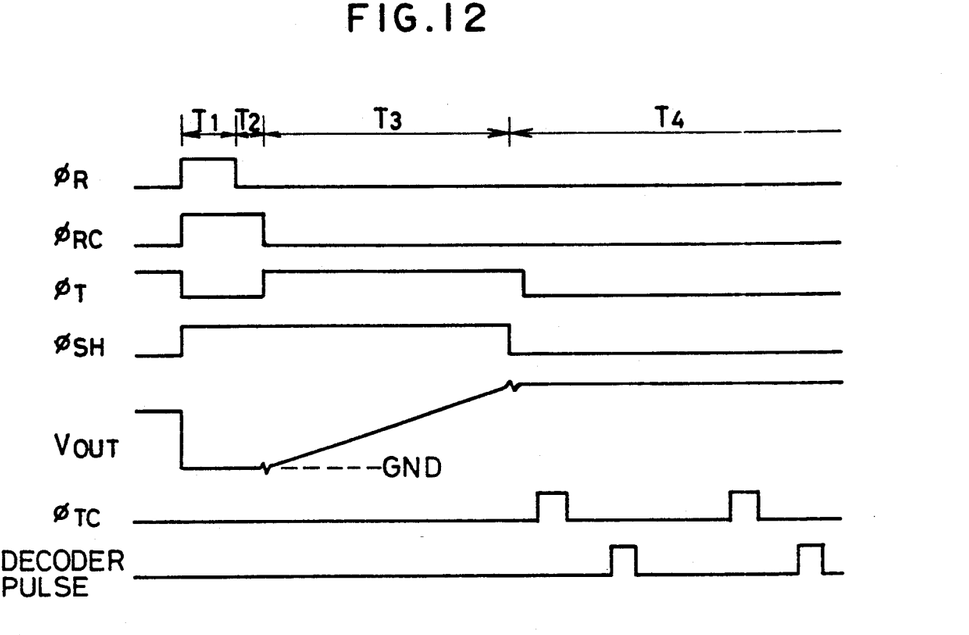
FIG. 12 is a timing chart for explanation of operation of the embodiment shown in FIG. 11.

FIG. 12 shows a timing chart for explanation of the operation of this embodiment. Because n-MOS transistors are replaced by p-MOS transistors and vice versa, driving pulses $\phi_{RC}$, $\phi_T$, and $\phi_{SH}$ are inverted with respect to those shown in the timing chart of FIG. 10, respectively. However, each switching MOS transistor operates in the exactly same way as well as a reset pulse $\phi_R$. What is new is that during a period $T_4$ the signal voltage is read out after the signal voltage is stored in the holding capacitor 43 via the n-MOS transistor 42 driven by a pulse $\phi_{TC}$. The sample-and-hold operation by the pulse $\phi_{TC}$ is performed at the same time for every pixel. The signal voltage of each pixel is stored in the holding capacitor 43, then the decoder 44 makes the selection n-MOS transistor 21 turn on so that the charge stored in the holding capacitor 43 is read out. Here, the pixel addition output is obtained by turning on simultaneously all selection n-MOS transistors 21 for a plurality of pixels with the decoder 44.

As shown in FIG. 12, the output voltage $V_{OUT}$ is held during the whole period $T_4$. Therefore, a large number of repetitions of readout are possible by turning on the pulse $\phi_{TC}$ many times. Hence, if a S/N ratio is not high enough after readout is performed for every pixel, then it is possible to make effective use of non-destructive readout in such a way that readout is performed by adding every two pixels.

Figure 13:
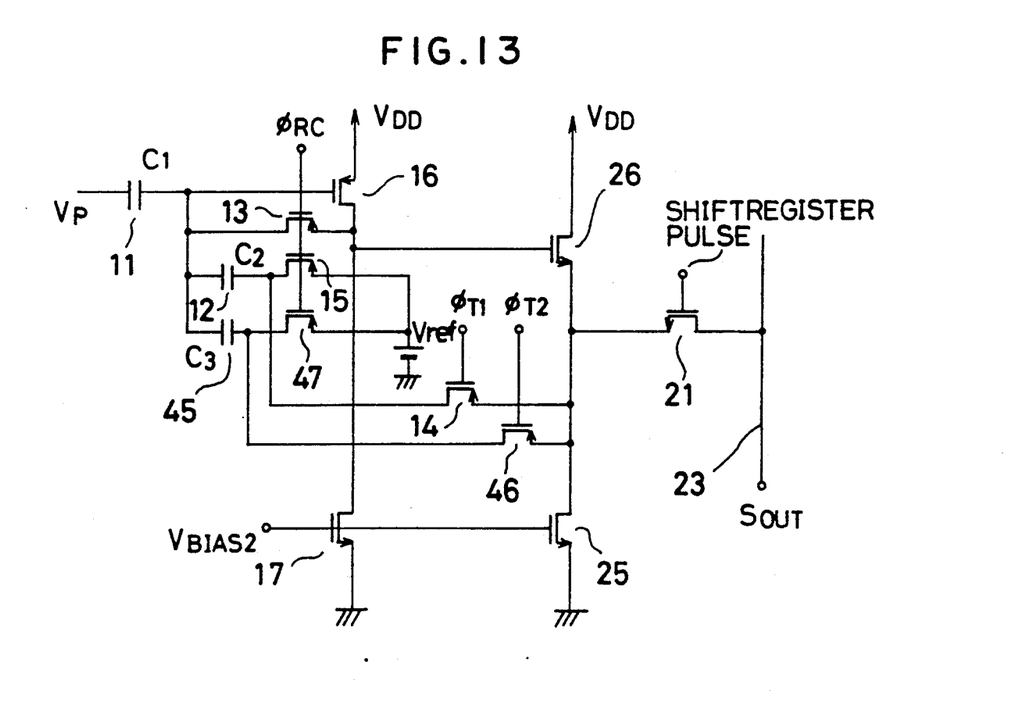
FIG. 13 is a diagram showing a circuit configuration of an embodiment wherein sensitivity can be changed.

Furthermore, the above FPN suppression circuit has another feature that the gain can be changed by changing the ratio of the capacitance $C_1$ of the capacitor 11 to the capacitance $C_2$ of the capacitor 12. Taking this advantage, switching of the sensitivity can be achieved. FIG. 13 shows an embodiment having a FPN suppression circuit whose sensitivity can be switched. As can be seen from the comparison with the embodiment shown in FIG. 7, this embodiment can be obtained by modifying the embodiment shown in FIG. 7 in such a way that a capacitor 45 (capacitance $C_3$) and a switching p-MOS transistor 46 are connected in the feedback system in the FPN suppression circuit of the embodiment of FIG. 7 and furthermore a switching p-MOS transistor 47 for applying a reference voltage Vref as an initial voltage to the node connecting the capacitor 45 to the p-MOS transistor 46.

Figure 8:
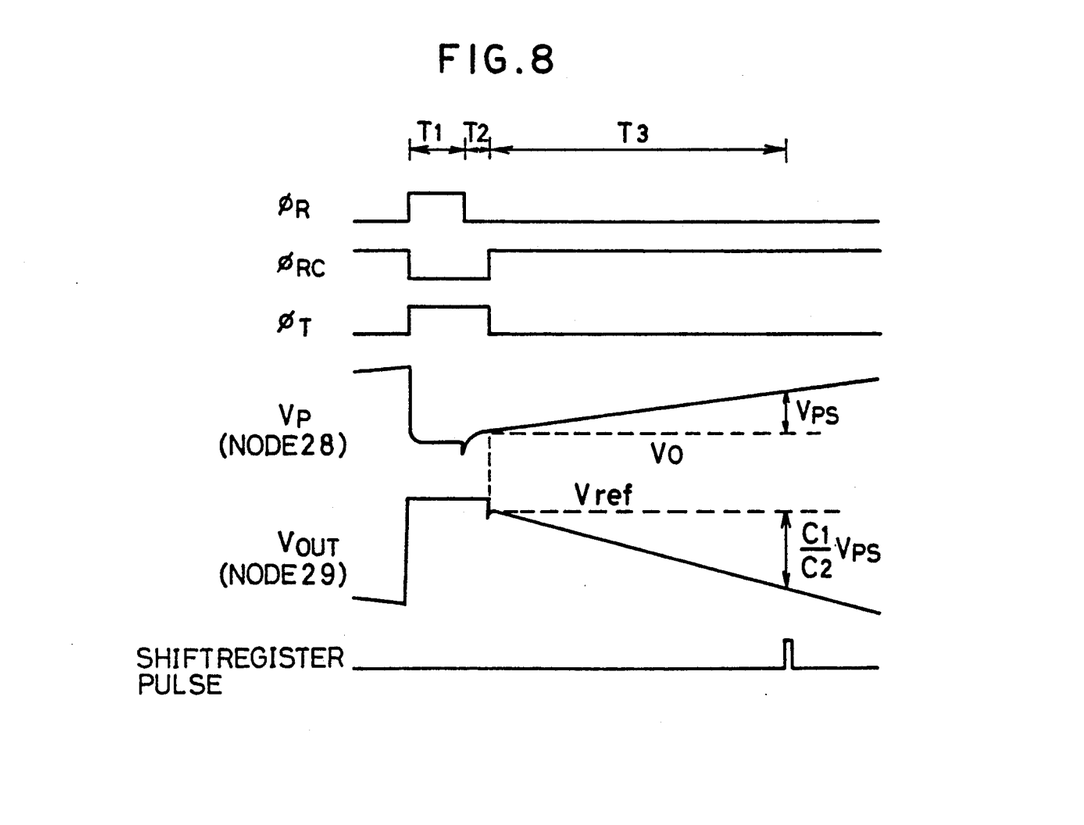
FIG. 8 is a timing chart for explanation of operation of the embodiment shown in FIG. 7.

Operation of this embodiment can be performed in the same way as that shown by the timing chart in FIG. 8. That is, referring to FIG. 8, during a period when the level of the pulse $\phi_T$ in FIG. 8 is 'L', one of pulses $\phi_{f1}$ and $\phi_{f2}$ for driving switching p-MOS transistors 14 and 46, or both of $\phi_{f1}$ and $\phi_{f2}$ are made to be 'L'. Such various combinations of pulses $\phi_{f1}$ and $\phi_{f2}$ set the gain of the FPN suppression circuit as follows:

The gain is given by $C_1/C_2$ when $\phi_{f1}$ is 'L' and $\phi_{f2}$ is 'H';

The gain is given by $C_1/C_3$ when $\phi_{f1}$ is 'H' and $\phi_{f2}$ is 'L'; and The gain is given by $C_1/(C_2+C_3)$ when both of $\phi_{f1}$ and $\phi_{f2}$ are 'L'.

In this way, the switching of the gain can be achieved by adding a capacitor and a switching element to the feedback system. In the embodiment shown in FIG. 13, the feedback capacitance is switched between two capacitances $C_2$ and $C_3$. However, finer setting of the gain is possible by increasing the number of feedback capacitors.

As can be seen from the above description based on the specific embodiments in accordance of the present invention, it is possible to achieve a solid state image pickup apparatus in which the FPN, caused by offset difference among the pixels composed of photoelectric transducer elements having a function of amplification, is suppressed by adding a circuit at the cost of slight increase in chip area, and in which it is possible to make a large number of repetitions of non-destructive readout of the signal output with suppressed FPN.

What is claimed is:

1. A solid state image pickup apparatus, comprising:
   pixels, each of said pixels being composed of a photoelectric transducer element having a function of amplification; and
   fixed-pattern-noise suppression basic cells, each of said cells comprising:
   an inverting amplifier;
   an input capacitor connected between the output of said pixel and the input of said inverting amplifier;
   a reset switching element for supplying an initial voltage to the input of said inverting amplifier;
   a feedback capacitor, one node of said feedback capacitor being connected to the input of said inverting amplifier;
   a feedback switching element connected between the other node of said feedback capacitor and the output of said inverting amplifier; and
   a switching element for supplying a reference voltage, connected between a reference voltage source and a node connecting the said feedback capacitor and the feedback switching element;
   whereby the fixed pattern noise caused by the offset variation of the pixels composed of a photoelectric transducer element is suppressed.

2. A solid state image pickup apparatus as defined in claim 1, wherein said inverting amplifier in said basic cell is a NMOS inverter comprising:
   an enhancement-mode MOS transistor acting as a common-source amplifier; and
   a depletion-mode MOS transistor acting as an active load connected to the drain of said enhancement-mode MOS transistor.

3. A solid state image pickup apparatus as defined in claim 1, wherein said inverting amplifier in said basic cell is a basic CMOS invertor where one device serves as a common-source amplifier and the other device acts as an active load.

4. A solid state image pickup apparatus as defined in claim 1, wherein said inverting amplifier in said basic cell has a function of sample-and-hold operation.

5. A solid state image pickup apparatus as defined in claim 4, wherein said inverting amplifier having a function of sample-and-hold operation comprises:
- a basic NMOS inverter;
- a source follower configuration;
- a sample-and-hold switching element connected between the output portion of said NMOS inverter and the input portion of said source follower configuration; and
- a sample-and-hold capacitor connected in parallel to the input portion of said source follower configuration;
- the input and output terminals of said inverting amplifier being the input portion of said NMOS inverter and the output portion of said source follower configuration, respectively.

6. A solid state image pickup apparatus as defined in claim 4, wherein said inverting amplifier having a function of sample-and-hold operation comprises:
- a basic CMOS inverter;
- a source follower configuration;
- a sample-and-hold switching element connected between the output portion of said CMOS inverter and the input portion of said source follower configuration; and
- a sample-and-hold capacitor connected in parallel to the input portion of said source follower configuration;
- the input and output terminals of said inverting amplifier being the input portion of said CMOS inverter and the output portion of said source follower configuration, respectively.

7. A solid state image pickup apparatus as defined in claim 1, wherein:
- a switching element for transferring a signal and a switching element for selecting a signal output are connected in series between said fixed-pattern-noise suppression basic cell and an output signal line; and
- a holding capacitor is connected in parallel to the node connecting said two switching elements.

8. A solid state image pickup apparatus as defined in claim 2, wherein:
- a switching element for transferring a signal and a switching element for selecting a signal output are connected in series between said fixed-pattern-noise suppression basic cell and an output signal line; and
- a holding capacitor is connected in parallel to the node connecting said two switching elements.

9. A solid state image pickup apparatus as defined in claim 3, wherein:
- a switching element for transferring a signal and a switching element for selecting a signal output are connected in series between said fixed-pattern-noise suppression basic cell and an output signal line; and
- a holding capacitor is connected in parallel to the node connecting said two switching elements.

10. A solid state image pickup apparatus as defined in claim 4, wherein:
- a switching element for transferring a signal and a switching element for selecting a signal output are connected in series between said fixed-pattern-noise suppression basic cell and an output signal line; and
- a holding capacitor is connected in parallel to the node connecting said two switching elements.

11. A solid state image pickup apparatus as defined in claim 5, wherein:
- a switching element for transferring a signal and a switching element for selecting a signal output are connected in series between said fixed-pattern-noise suppression basic cell and an output signal line; and
- a holding capacitor is connected in parallel to the node connecting said two switching elements.

12. A solid state image pickup apparatus as defined in claim 6, wherein:
- a switching element for transferring a signal and a switching element for selecting a signal output are connected in series between said fixed-pattern-noise suppression basic cell and an output signal line; and
- a holding capacitor is connected in parallel to the node connecting said two switching elements.

13. A solid state image pickup apparatus as defined in claim 7, wherein:
- said switching element for selecting a signal output is provided to form a configuration which enables ON states for a plurality of pixels so that the output of the addition of a plurality of pixels can be obtained.

14. A solid state image pickup apparatus as defined in claim 8, wherein:
- said switching element for selecting a signal output is provided to form a configuration which enables ON states for a plurality of pixels so that the output of the addition of a plurality of pixels can be obtained.

15. A solid state image pickup apparatus as defined in claim 9, wherein:
- said switching element for selecting a signal output is provided to form a configuration which enables ON states for a plurality of pixels so that the output of the addition of a plurality of pixels can be obtained.

16. A solid state image pickup apparatus as defined in claim 10, wherein:
- said switching element for selecting a signal output is provided to form a configuration which enables ON states for a plurality of pixels so that the output of the addition of a plurality of pixels can be obtained.

17. A solid state image pickup apparatus as defined in claim 11, wherein:
- said switching element for selecting a signal output is provided to form a configuration which enables ON states for a plurality of pixels so that the output of the addition of a plurality of pixels can be obtained.

18. A solid state image pickup apparatus as defined in claim 12, wherein:
- said switching element for selecting a signal output is provided to form a configuration which enables ON states for a plurality of pixels so that the output of the addition of a plurality of pixels can be obtained.

19. A solid state image pickup apparatus, comprising:
pixels, each of said pixels being composed of a photoelectric transducer element having a function of amplification; and
fixed-pattern-noise suppression basic cells, each of said cells comprising:
an inverting amplifier;
an input capacitor connected between the output of said pixel and the input of said inverting amplifier;
a reset switching element for supplying an initial voltage to the input of said inverting amplifier;
a first feedback capacitor, one node of said feedback capacitor being connected to the input of said inverting amplifier;
a first feedback switching element connected between the other node of said first feedback capacitor and the output of said inverting amplifier;
a first switching element for supplying a reference voltage, connected between a reference voltage source and a node connecting the said first feedback capacitor and said first feedback switching element;
a second feedback capacitor, one node of said feedback capacitor being connected to the input of said inverting amplifier;
a second feedback switching element connected between the other node of said second feedback capacitor and the output of said inverting amplifier;
a second switching element for supplying a reference voltage, connected between said reference voltage source and a node connecting the said second feedback capacitor and said second feedback switching element;
whereby the fixed pattern noise caused by the offset variation of the pixels composed of a photoelectric transducer element is suppressed, and output gain can be controlled.

20. A method for driving a solid state image pickup apparatus, said solid state image pickup apparatus comprising:
a pixel array composed of pixels, each of said pixels being composed of a photoelectric transducer element having a function of amplification, said pixels being arranged in two-dimensional form; and
fixed-pattern-noise suppression basic cells, one of said basic cells being provided for every column of said pixel array, each of said cells comprising:
an inverting amplifier;
an input capacitor connected between a vertical signal line provided for every column and the input of said inverting amplifier;
a reset switching element for supplying an initial voltage to the input of said inverting amplifier;
a feedback capacitor, one node of said feedback capacitor being connected to the input of said inverting amplifier;
a feedback switching element connected between the other node of said feedback capacitor and the output of said inverting amplifier; and
a switching element for supplying a reference voltage, connected between a reference voltage source and a node connecting the said feedback capacitor and the feedback switching element;
said method for driving said solid state image pickup apparatus comprising steps of:
turning on both of said reset switching element and said switching element for supplying a reference voltage; and turning off said feedback switching element; then reading out signal output of pixels of a selected row of said pixel array;
then turning off both of said reset switching element and said switching element for supplying a reference voltage; and turning on said feedback switching element; then resetting the charges stored in the pixels of the selected row of said pixel array; and
then reading out the output voltage of the basic cell;
whereby the output containing suppressed fixed pattern noise is obtained.

21. A method for driving a solid state image pickup apparatus, said solid state image pickup apparatus comprising:
a pixel array composed of pixels, each of said pixels being composed of a photoelectric transducer element having a function of amplification, said pixels being arranged in one-dimensional or two-dimensional form; and
fixed-pattern-noise suppression basic cells, one of said basic cells being provided for every pixel of said pixel array, each of said cells comprising:
an inverting amplifier;
an input capacitor connected between the output of a pixel and the input of said inverting amplifier;
a reset switching element for supplying an initial voltage to the input of said inverting amplifier;
a feedback capacitor, one node of said feedback capacitor being connected to the input of said inverting amplifier;
a feedback switching element connected between the other node of said feedback capacitor and the output of said inverting amplifier; and
a switching element for supplying a reference voltage, connected between a reference voltage source and a node connecting the said feedback capacitor and the feedback switching element;
said method for driving said solid state image pickup apparatus comprising steps of:
turning on both of said reset switching element and said switching element for supplying a reference voltage; and turning off said feedback switching element; then resetting a pixel;
then turning off both of said reset switching element and said switching element for supplying a reference voltage; and turning on said feedback switching element; then performing integration of the pixel; and
after a predetermined period elapsed, reading out the output voltage of the basic cell;
whereby the output containing suppressed fixed pattern noise is obtained.

* * * * *